US012030655B2

(12) United States Patent
Zagrodnik et al.

(10) Patent No.: US 12,030,655 B2
(45) Date of Patent: Jul. 9, 2024

(54) AIRCRAFT BATTERY SYSTEM INCLUDING A PRESSURE-SENSITIVE ELEMENT SEALING A BATTERY VENTING REGION FROM A FLUID CHANNEL

(71) Applicant: ROLLS-ROYCE plc, London (GB)

(72) Inventors: Michael Adam Zagrodnik, Singapore (SG); Krishnamoorthi Sivalingam, Singapore (SG); Satyanarayana Reddy Gajjela, Singapore (SG); Vidor Veres-Szekely, Mosdós (HU); Daniel Lorincz, Singapore (SG); István Örökös-Tóth, Egar (HU); Anand Prabhu Mathivanan, Singapore (SG)

(73) Assignee: ROLLS-ROYCE plc, London (GB)

( * ) Notice: Subject to any disclaimer, the term of this patent is extended or adjusted under 35 U.S.C. 154(b) by 156 days.

(21) Appl. No.: 17/751,172

(22) Filed: May 23, 2022

(65) Prior Publication Data
US 2022/0402620 A1    Dec. 22, 2022

(30) Foreign Application Priority Data

Jun. 16, 2021  (GB) .................................... 2108574

(51) Int. Cl.
*H01M 10/613*      (2014.01)
*B60L 50/64*       (2019.01)
(Continued)

(52) U.S. Cl.
CPC .............. *B64D 27/24* (2013.01); *B60L 50/64* (2019.02); *B60L 58/26* (2019.02);
(Continued)

(58) Field of Classification Search
CPC ............... B64D 27/24; H01M 10/613; H01M 2220/20; B64C 29/0033; B60L 50/64; B60L 58/26; B60L 2200/10
(Continued)

(56) References Cited

U.S. PATENT DOCUMENTS

| 4,468,440 A | 8/1984 | Evjen |
| 5,320,190 A | 6/1994 | Naumann et al. |

(Continued)

FOREIGN PATENT DOCUMENTS

| CN | 211108019 U | 7/2020 |
| CN | 112531238 A | 3/2021 |

(Continued)

OTHER PUBLICATIONS

U.S. Appl. No. 17/751,072, filed May 23, 2022 in the name of Zagrodnik et al.

(Continued)

*Primary Examiner* — Brady W Frazier
(74) *Attorney, Agent, or Firm* — Oliff PLC (57) ABSTRACT

An aircraft including a battery pack having a plurality of battery cells arranged to vent into a venting region of the battery pack. A path is defined between the venting region and an exterior of the aircraft, whereby thermal products vented by the cells can exit the aircraft via the path. In some embodiments, the venting region is or is in fluid communication with an air channel through which air flows from an aircraft air inlet to an aircraft air outlet. In other embodiments, the path joins the venting region and an opening in an external surface of the aircraft.

19 Claims, 9 Drawing Sheets

(51) Int. Cl.
  *B60L 58/26* (2019.01)
  *B64C 29/00* (2006.01)
  *B64D 27/24* (2024.01)

(52) U.S. Cl.
  CPC ....... *B64C 29/0033* (2013.01); *H01M 10/613* (2015.04); *B60L 2200/10* (2013.01); *H01M 2220/20* (2013.01)

(58) Field of Classification Search
  USPC .......................................................... 244/55
  See application file for complete search history.

(56) References Cited

U.S. PATENT DOCUMENTS

| | | | |
|---|---|---|---|
| 9,413,045 B2 | 8/2016 | Inoue | |
| 9,415,878 B2 | 8/2016 | Wetzel | |
| 9,764,833 B1* | 9/2017 | Tighe | B64D 13/006 |
| 2004/0026563 A1 | 2/2004 | Moller | |
| 2006/0172188 A1 | 8/2006 | Okuda et al. | |
| 2012/0261523 A1 | 10/2012 | Shaw | |
| 2013/0140101 A1 | 6/2013 | Lim et al. | |
| 2013/0273829 A1 | 10/2013 | Obasih et al. | |
| 2014/0242424 A1 | 8/2014 | Jones | |
| 2015/0232191 A1 | 8/2015 | Wetzel | |
| 2016/0164150 A1* | 6/2016 | Schilder | H01M 10/6561 429/82 |
| 2016/0167800 A1 | 6/2016 | Joubert et al. | |
| 2017/0259937 A1 | 9/2017 | Plessner et al. | |
| 2017/0271636 A1 | 9/2017 | Rohrbach et al. | |
| 2018/0105282 A1* | 4/2018 | Tweet | A62C 3/065 |
| 2018/0287234 A1 | 10/2018 | Melack et al. | |
| 2019/0097282 A1 | 3/2019 | Melack et al. | |
| 2019/0097288 A1 | 3/2019 | Oh et al. | |
| 2019/0165408 A1 | 5/2019 | Andryukov et al. | |
| 2020/0194852 A1 | 6/2020 | Muniz et al. | |
| 2021/0053689 A1* | 2/2021 | Lynn | B64D 13/08 |
| 2021/0078714 A1 | 3/2021 | Demont et al. | |
| 2021/0083255 A1 | 3/2021 | Demont et al. | |
| 2021/0155350 A1 | 5/2021 | Kwon | |

FOREIGN PATENT DOCUMENTS

| | | |
|---|---|---|
| EP | 2882010 A1 | 6/2015 |
| EP | 2942226 A1 | 11/2015 |
| EP | 3565083 A1 | 11/2019 |
| EP | 3576182 A1 | 12/2019 |
| WO | 2013/019336 A1 | 2/2013 |
| WO | 2020/123854 A1 | 6/2020 |

OTHER PUBLICATIONS

U.S. Appl. No. 17/751,113, filed May 23, 2022 in the name of Zagrodnik et al.
U.S. Appl. No. 17/751,054, filed May 23, 2022 in the name of Zagrodnik et al.
Aug. 11, 2021 Combined Search and Examination Report issued in Great Britain Patent Application No. 2108576.6.
Aug. 17, 2021 Combined Search and Examination Report issued in Great Britain Patent Application No. 2108575.8.
Aug. 13, 2021 Combined Search and Examination Report issued in Great Britain Patent Application No. 2108574.1.
Aug. 17, 2021 Combined Search and Examination Report issued in Great Britain Patent Application No. 2108573.3.
Oct. 25, 2022 Search Report issued in European Patent Application No. 22174586.2.
Oct. 25, 2022 Search Report issued in European Patent Application No. 22174584.7.
Oct. 25, 2022 Search Report issued in European Patent Application No. 22174585.4.
Oct. 4, 25, 2022 Search Report issued in European Patent Application No. 22174587.0.
Jan. 3, 2024 Office Action issued in U.S. Appl. No. 17/751,072.
May 1, 2024 Office Action issued in U.S. Appl. No. 17/751,072.

* cited by examiner

AIRCRAFT BATTERY SYSTEM INCLUDING A PRESSURE-SENSITIVE ELEMENT SEALING A BATTERY VENTING REGION FROM A FLUID CHANNEL

CROSS-REFERENCE TO RELATED APPLICATIONS

This specification is based upon and claims the benefit of priority from United Kingdom Patent Application No. 2108574.1, filed on 16 Jun. 2021, the entire contents of which are incorporated herein by reference.

TECHNICAL FIELD

The present disclosure relates to batteries and battery thermal regulation systems, particularly but not exclusively for use in electric and hybrid electric aircraft.

BACKGROUND

Interest in aircraft with electric and hybrid electric propulsion systems is increasing because of the need to reduce carbon emissions and pollution, and because of developments in the facilitating electrical technologies. Hybrid electric propulsion systems include both internal combustion engines, for example gas turbines or diesel engines, and energy storage, typically in the form of batteries. Purely electric propulsion systems completely dispense with internal combustion engines and use only batteries or, in some instances, fuel cells, as an energy source for their propulsors.

Urban Air Mobility (UAM) refers to the use of aircraft—typically electric and hybrid electric aircraft—to transport passengers relatively short distances, for example tens or perhaps hundreds of kilometres. Most proposed UAM platforms, sometimes known as 'air taxis' or 'flying taxis', have Vertical Take-Off and Landing (VTOL) or Short Take-Off and Landing (STOL) capabilities so that the aircraft can take-off and land at locations convenient for passengers, for example at so-called 'vertiports' close to or in urban environments. It is expected that the number of passengers carried by UAM platforms will be relatively small—likely fewer than twenty and typically of the order of five to ten.

Figure 1:
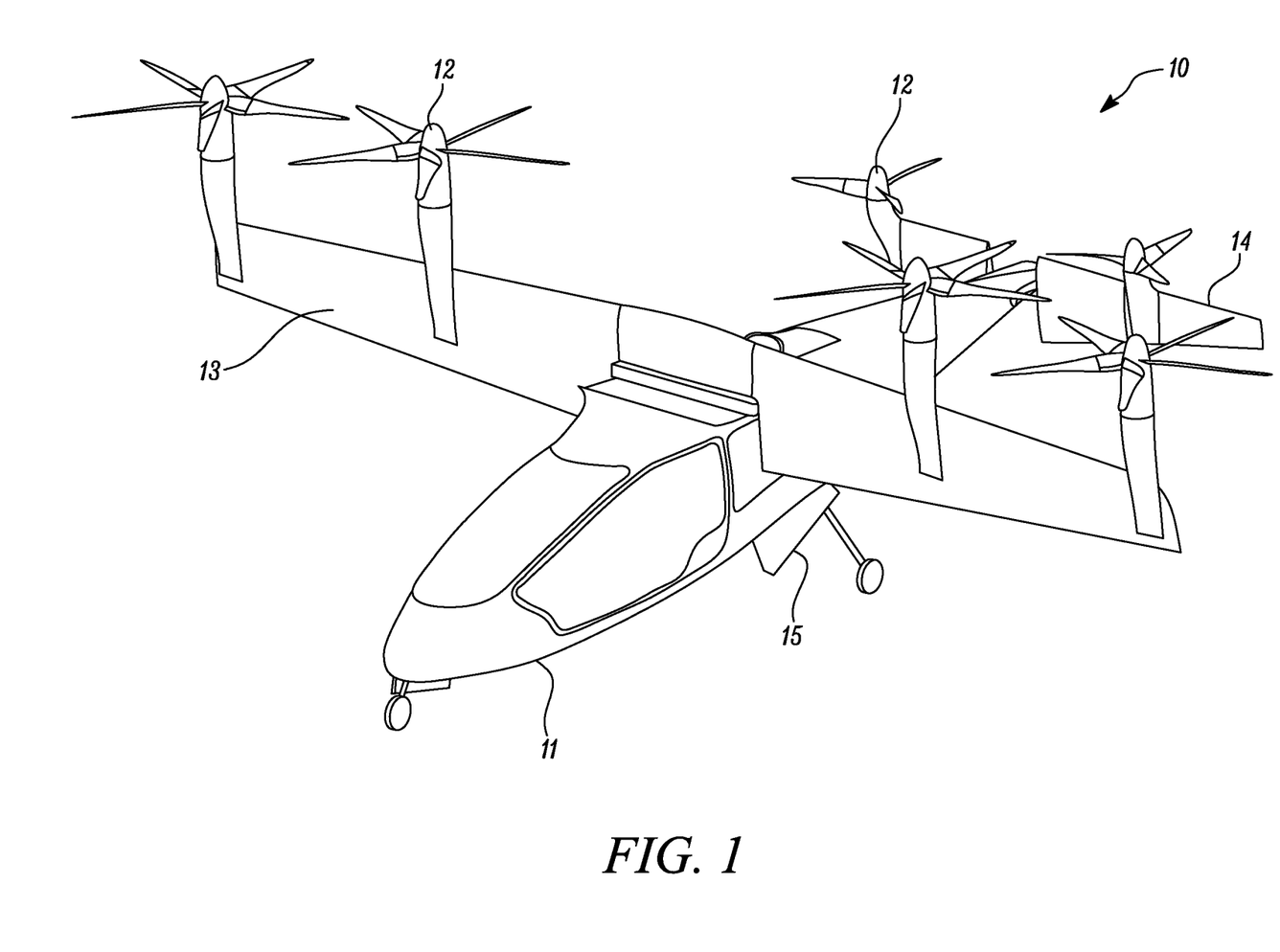
FIG. 1 is a perspective view of an electric aircraft in a VTOL configuration.

Various configurations have been proposed for UAM platforms, and one example is illustrated in FIG. 1. The aircraft 10 includes a fuselage 11 and a distributed propulsion system which includes a number, in this case six, of propulsors 12 in the form of open rotors driven by rotary electric machines. The propulsors, which in this case are attached to wings 13 or other flight surfaces 14, are tiltable between a VTOL configuration (shown FIG. 1) and a horizontal flight configuration to facilitate both modes of flight. Other proposed configurations are helicopter-like configurations, for example multi-copters (e.g., quadcopters with ducted fans) and the like.

SUMMARY

The present invention relates to battery packs and to aircraft comprising such battery packs.

According to a first aspect, there is provided an aircraft comprising a battery pack having a plurality of battery cells. Each of the battery cells is arranged to vent into a venting region of the battery pack. There is a path between the venting region of the battery pack and an exterior of the aircraft, whereby thermal products vented by the battery cells can exit the aircraft via the path.

Providing a dedicated path between the venting region and an exterior of the aircraft helps ensure that thermal products, for example hot gas, smoke and other particulates which may vent from the cells during a thermal event, can escape the aircraft in a controlled manner. Not only does this ensure that thermal products do not accumulate in the battery pack or elsewhere aircraft, which could increase risk of a thermal event propagating or a fire or explosion occurring, it reduces the risk of toxic and/or combustible products entering the cabin or other sensitive areas of the aircraft.

The battery pack may comprise a plurality of venting regions. Each cell may be arranged to vent into one of the plurality of venting regions, and there may be a respective path between each respective one of the plurality of venting regions and the exterior of the aircraft. For example, the battery may comprise two or more sub-modules each comprising an array of cells, and each sub-module may have its own venting region and associated path to a location exterior of the aircraft.

Each battery cell may have a pre-determined venting direction, and the cells may be oriented with respect to their venting directions such that each cell vents into a venting region. The cells may be cylindrical cells in which case the venting directions may be parallel to the axes of the cylinders and from one of two opposed ends.

The venting region(s) and/or the path(s) between the venting region and the exterior of the aircraft may contain a flame arrestor. The flame arrestor may comprise one or more of: metal foam; metal mesh; and/or ceramic mesh. Providing a flame arrestor may significantly reduce the risk of fire or explosion in the time between cell venting and the thermal products escaping the aircraft.

The aircraft may further comprise a pressure-sensitive element arranged in the path(s). The pressure-sensitive element may be configured to seal the venting region until a pressure in the venting region exceeds a threshold level. The pressure-sensitive element may, for example, be an overpressure activated burst disk or a one-way valve with a cracking pressure.

The venting region(s) may be within a lid or cap of the battery pack, which may be removable. The lid or cap may be located at an exterior region of the pack, for example a surface of the lid or cap may form an exterior surface of the pack.

The battery pack may be located in a fuselage of the aircraft, may be located within a propulsor of the aircraft, or may be located elsewhere. Placement within the fuselage may provide for better dynamics and ease of assembly and maintenance. Placement within a propulsor may reduce the risk of fire or smoke spreading to the cabin and/or a higher airflow rate.

In one group of embodiments, each respective path is a channel between the respective venting region of the battery pack and an opening in an external surface of the aircraft. The channel may include a tube or other conduit. The opening in the external surface of the aircraft may be an opening in a fuselage of the aircraft. There may be a single opening in the fuselage or multiple openings.

The battery pack may be located within the aircraft so that the venting region and the opening in the external surface of the aircraft are in close proximity to each other, for example located adjacent to each other. For example, a perpendicular distance between an exit aperture in the venting region of the battery pack and the opening in the external surface of the aircraft may be less than 1 metre, preferably less than 50 cm, more preferably less than 30 cm. Selecting the location of the pack so that there is a short distance between an exit of the venting region and the opening may help ensure thermal products can escape the aircraft quickly and with few reduced opportunity to accumulate.

In another group of embodiments, the battery pack or the aircraft comprises a channel in fluid communication with an aircraft air inlet and an aircraft air outlet. During flight, air enters the aircraft through the inlet, flows through the channel and exits the aircraft through the outlet. Each respective venting region may be, or may be in fluid communication with, a respective channel so that thermal products vented by the cells can exit the aircraft through the air outlet via the channel. Thus, the flow of air provided by the aircraft's movement can be leveraged to remove thermal products efficiently and without the provision of fans or other active components to force a dedicated airflow.

The air inlet and the air outlet may be located on an exterior surface of a fuselage of the aircraft; located on a propulsor of the aircraft or located elsewhere on the aircraft.

The channel may be an integral part of the battery pack. In this way, the channel can be formed during manufacture and its presence does not impose further assembly or maintenance requirements. In other examples the channel may be located outside of the battery pack but within the aircraft.

The channel may be the venting region, in which case the battery cells may be arranged to vent directly into the channel. Venting directly into a channel through which air flows allows the thermal products to be swept away almost immediately, reducing the opportunity for accumulation.

The battery pack may include a path between the venting region and the channel. The path between the venting region and the channel may be an interior region or volume of the battery pack, and may be located about an exterior region of the battery pack.

The channel may be a dual purpose channel which both cools the cells through indirect air cooling and carries away cell thermal products. Combining these functions may reduce the size and weight of the pack and reduce assembly and maintenance requirements.

In other embodiments the aircraft or battery pack may comprise one or more further air cooling channels which cools the channels by indirect air cooling. The one or more further air cooling channels may be in fluid communication with the air inlet and the air outlet whereby, during flight, air enters the aircraft through the inlet, flows through the channel and exits the aircraft through the outlet.

Each of the battery cells may extend between a first and an opposed second end. The cells may be arranged to vent from their second ends into the venting region. In this way, the cells can vent away from the core of the battery pack, reducing the likelihood that thermal events will propagate between cells and regions of cells. The cells may be cooled from their first ends.

The cells may be in thermal contact with a base plate. A portion of a surface of the cooling channel may be in thermal contact with the base plate whereby, during flight, air flowing through the cooling channel exchanges heat with the cells through the base plate. The portion of the surface of the cooling channel may form the base plate.

The channel may extend substantially the entire length of the battery pack. The length of the battery may be measured parallel to the general direction of airflow through the air channel, which may correspond to the general direction of horizontal flight of the aircraft. The battery pack may have a generally cuboidal shape, with a length measured parallel to the general direction of airflow through the channel, a height generally parallel to gravity and perpendicular to the length, and a width mutually perpendicular to the length and height.

The aircraft may be a purely electric aircraft, or it may be a hybrid electric aircraft.

In other embodiments the aircraft is a 'more electric' aircraft, in which propulsive thrust is exclusively or almost exclusively provided by one or more engines, and the battery is used to improve engine operability, for example by adding or removing power from engine spools during transients, or by powering electrical loads during engine transients.

The aircraft may be of the VTOL type. For example, the aircraft may have a reconfigurable propulsion system reconfigurable between a vertical flight configuration and a horizontal flight configuration.

In other examples the aircraft may be of the STOL type.

According to a second aspect, the battery pack of the first aspect is provided separately.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

FIG. 1

FIG. 1 illustrates an electric aircraft 10 which may be used for UAM applications. The aircraft includes a fuselage 11, which incorporates a cabin for occupants, and a distributed propulsion system which in this case has six open rotor propulsors 12 driven by rotary electric machines. Also visible in FIG. 1 is a retractable undercarriage 15 in which a landing platform, in this case having wheels, can be stowed during flight.

The size of the fuselage 11 and the cabin will depend on the application requirements, but in this example they are sized for five occupants including a pilot. It is however envisaged that some UAM platforms will not require a pilot and will instead be flown under the control of an autopilot system.

Four of the propulsors 12 are attached to the wings 13 of the aircraft 10, and the remaining two propulsors 12 are attached to a separate flight control surface 14 located towards the rear of the aircraft 10. In this embodiment the wings 13 and the rear control surface 14 are tiltable between a VTOL configuration (shown in FIG. 1) in which the axes of the rotors point upward and a horizontal flight configuration (shown in FIG. 3, with the front rotors omitted for clarity) in which the axes of the rotors point forward. The horizontal flight configuration, whilst principally used for horizontal flight, may also be used for taxiing and possibly STOL operation if supported.

The electrical systems, including the electric machines that power the aircraft 10, receive electrical power from one or more battery packs located within the aircraft. The battery packs may be located in any suitable part or parts of the aircraft, including the fuselage 11, the wings 13 and the propulsors 12.

Figure 2:
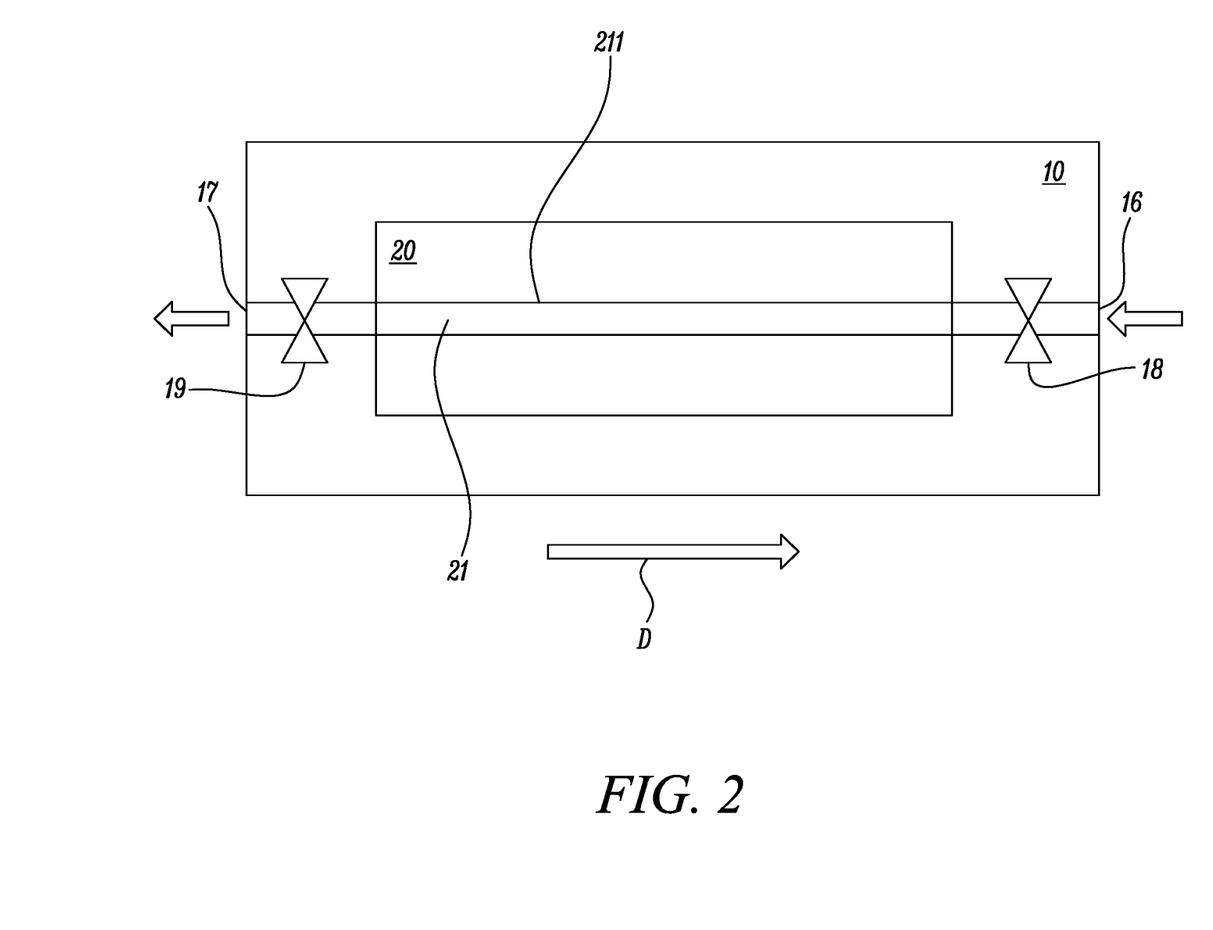
FIG. 2 is a schematic illustration of an electric aircraft with a battery pack cooled by indirect air cooling.

Whilst the illustrated aircraft 10 is an electric VTOL (eVTOL) aircraft, it will be appreciated that UAM platforms could also be of the STOL type and could also be hybrid electric aircraft that include both internal combustion engines and batteries. Hybrid electric platforms may utilize similar distributed propulsion system configurations, but the underlying power system may be a series hybrid, parallel hybrid, turboelectric or other type of hybrid power system.
FIG. 2

The cells of the battery packs will require thermal regulation to maintain optimal performance and to reduce the risk of overheating, which could result in damage to the cells or even fire. To this end, a battery pack and/or the aircraft 10 in which the battery pack is incorporated will include a battery thermal regulation system.

FIG. 2 illustrates an aircraft 10 in schematic form with a battery pack 20 incorporated into the aircraft in accordance with some embodiments of the present disclosure. The battery pack 20 includes an integral air channel 21 which passes through the battery pack. One end of the channel 21 is fluidly coupled to an aircraft air inlet 16, and the other end of the channel 21 is fluidly coupled to an aircraft air outlet 17. During flight, the direction of which is illustrated by the arrow D' in FIG. 2, ambient air enters the air inlet 16, flows through the channel 21 and flows out of the air outlet 17.

The wall 211 of the air channel 21 is in thermal contact with the cells of the battery pack, so heat flows from (or to) the cells to (or from) the air flowing through the channel 21. Thus, the flow of ambient air resulting from the normal movement of the aircraft 10 is leveraged to cool (or heat) the cells.

It should be appreciated that although the air flowing through the channel 21 is in thermal contact with the cells, the air does not directly contact the cells. Instead, the cells are enclosed within a housing and exchange heat with the air indirectly through the wall 211 of the channel 21. The cells may, for example, be attached to the exterior surface of the wall 211 of the air channel 21 (such that the wall 211 is a heat sink for the cells), or may be attached to a separate heat sink (e.g., an aluminium base plate) which is in close thermal contact with the wall 211 of the air channel 21. Thus, although the ambient air flow is used to cool (or heat) the cells, the air need not be filtered or otherwise conditioned to remove moisture, particulates or chemicals which could damage or degrade the cells or electrical connections of the battery pack. Nevertheless a filter may be provided to prevent debris entering and blocking the air channel 21.

Furthermore, provided the heat sink (e.g., the wall 211 of the air channel 21 or a base plate coupled thereto) is made of a material with a low thermal mass (e.g., aluminium, magnesium or an alloy of magnesium), the temperature of the heat sink will remain approximately uniform over its entire length. The cells will therefore be cooled (or heated) in a substantially uniform manner. In contrast this may not be the case in systems in which air flows in direct contact with the cells, due in part to unpredictable airflow and the change in temperature of the air as it flows through the pack.

The arrangement of FIG. 2 further includes an adjustable airflow regulator 18 located between the air inlet 16 and the entrance to the air channel 21 of the battery pack. The adjustable airflow regulator 18, which can take any suitable form such as vanes, an iris or a butterfly valve, any of which may be electrically or mechanically actuated, allows the rate of the airflow through the channel 21 to be regulated in accordance with the cooling or heating requirements of the pack 20. In this embodiment a further adjustable airflow regulator 19 is located between the exit of the air channel 21 and the air outlet 17.

In some embodiments, the airflow regulator 18 (and optionally the airflow regulator 19) can be adjusted to completely or almost completely prevent the flow of air through the channel 21. This may be useful where it is desirable to heat the cells, for example where the aircraft 10 has been exposed to cold ambient conditions between uses or during use, as the heat generated by the cells during their discharge is not carried away by airflow through the channel 21. The channel 21 may also be completely or partially closed in some modes of operation of a reconfigurable thermal management system, such as the one described below with reference to FIG. 10.
FIG. 3

Figure 3:
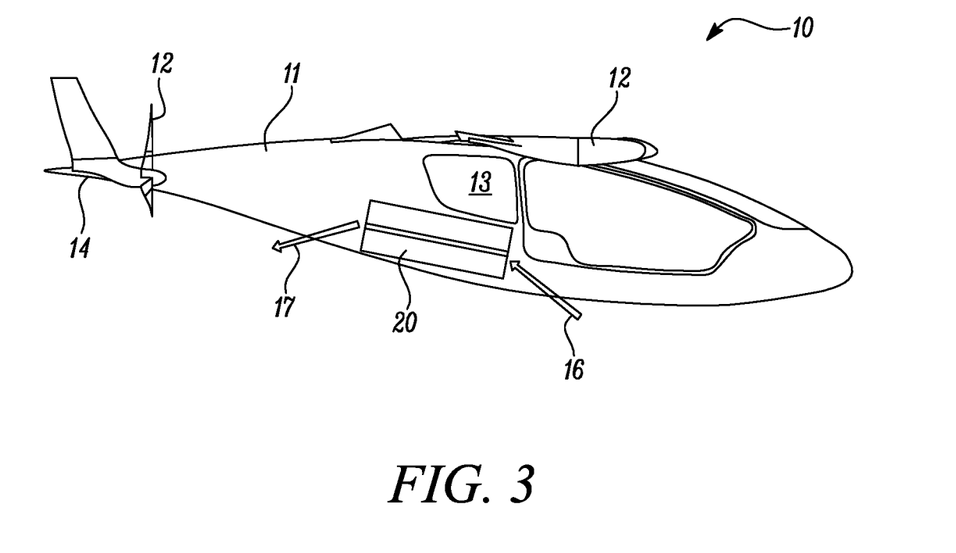
FIG. 3 is a side-view of the aircraft of FIG. 1 in a horizontal flight configuration, further showing a possible location for a battery pack within the fuselage of the aircraft.

FIG. 3 illustrates how the battery pack 20 of FIG. 2 may be located within the fuselage 11 of an aircraft 10.

In this embodiment the battery pack 20 is located aft of the cabin, which may be preferable to reduce the risk of gas, smoke or fire from the batteries reaching the passenger cabin. Whilst aft the cabin, the battery pack 20 is located in a middle region of the fuselage 11 such that, when the pack is installed, the centre of gravity of the aircraft 10 coincides with the battery pack 20. The battery pack 20 is relatively heavy and dense, so locating the pack so that it coincides with the centre of gravity of the aircraft helps reduce its impact on the dynamics of the aircraft 10.

So that air can enter the air channel 21 of the battery pack 20, the fuselage 11 includes an air inlet 16 in the form of an opening or aperture in an external surface of the fuselage. Likewise, the fuselage 11 includes an opening or aperture in an external surface to form an air outlet 17. The size and location of the apertures 16, 17 should be selected to provide adequate airflow during horizontal flight and, preferably, also during vertical take-off and landing. In some embodiments there may be multiple air inlet openings 16 in fluid communication with the air channel 21 so that there is adequate airflow during both horizontal flight and vertical movement. The air outlet 17 may also include multiple openings.

The path between the opening that forms the air inlet 16 and the entrance to the air channel 21 can take any form suitable for the specific application. In some embodiments, the opening and path between the opening and the air channel 21 may take the form of a continuous opening and channel defined in the airframe. In other embodiments, a separate air conduit may be attached between the opening and the entrance of the air channel 21. The path between the opening that forms the air outlet 17 and the exit of the air channel 21 can take a similar form.

It should be appreciated that although only one battery pack 20 is illustrated, the aircraft 10 and its fuselage 11 may include multiple battery packs 20. Multiple battery packs 20 may be arranged in parallel airflow, for example.

Figure 4:
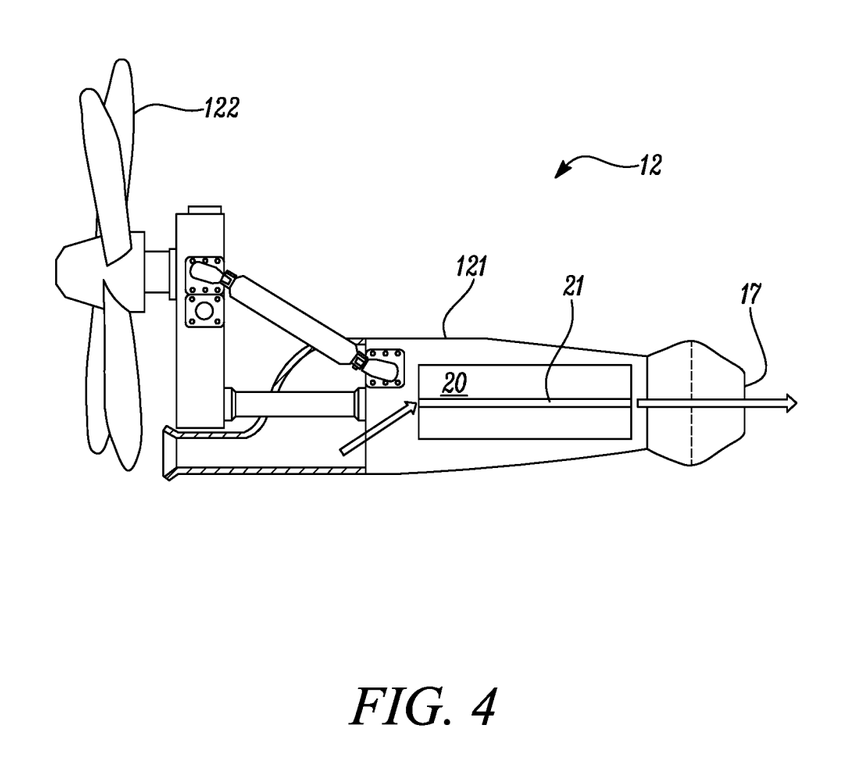
FIG. 4 is a side-view of a propulsor of an aircraft incorporating a battery pack.

FIG. 4

FIG. 4 illustrates how the battery pack 20 of FIG. 2 may be located within a propulsor 12 of an aircraft 10.

As can be seen, the battery pack 20 is located within a housing 121 of the propulsor located aft of the rotor 122. An air inlet 16 through which air can enter the housing 121 and reach the air channel 21 of the battery pack 20 is located at the front of the housing 121, in this case beneath the rotor 122. The air then exits the air channel 21 and subsequently the housing 121 through an air outlet 17.

Locating battery packs 20 within propulsors 12 may advantageously allow a battery, motor and power electronics combination to be assembled together as a single unit. Further, it increases the distance between the battery and cabin, which may reduce some of the risks associated with battery fire and other faults. Conversely, it may make ground-based maintenance of the battery packs more difficult and make the propulsors bulkier.

Figure 5A:
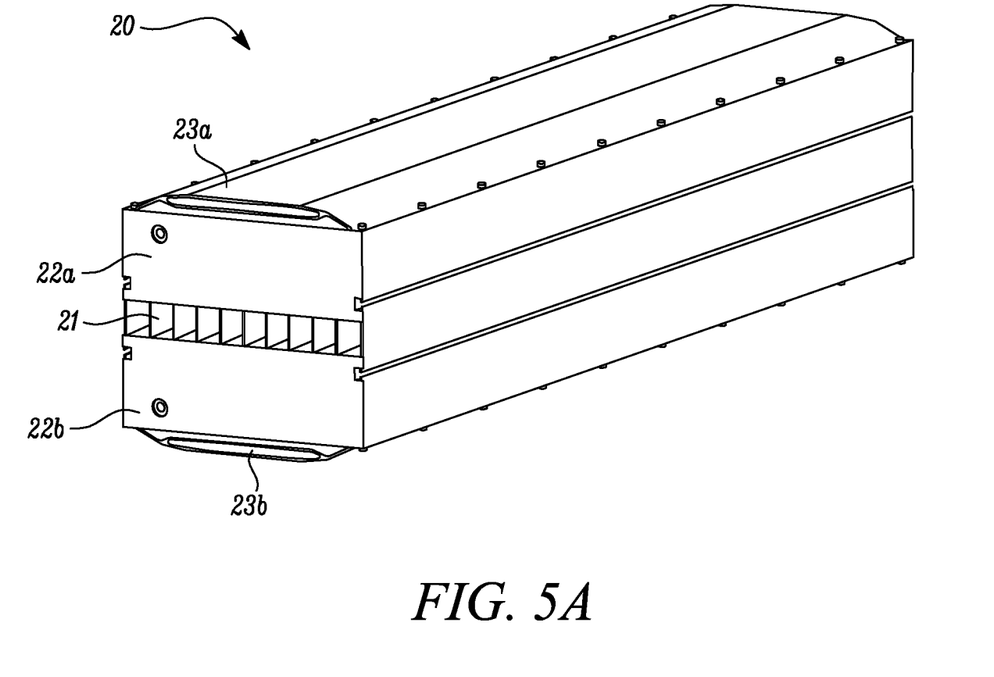
FIG. 5A is a perspective view of a battery pack with integral air channels for indirect air cooling.

FIG. 5A

FIG. 5A is a perspective view of a battery pack 20 of the type described above with reference to FIGS. 2-4.

The battery pack 20 includes a central, straight, longitudinally extending air channel 21 of rectangular cross-section. As can be seen, the air channel 21 actually comprises multiple (in this case ten) parallel air channels separated by dividing walls. The air channel 21 extends the entire length of the pack 20, which in a specific embodiment is approximately 1 metre long.

Either side of the air channel 21, the pack 20 includes a housing portion 22a, 22b which houses an array of battery cells, and a removable module cap 23a, 23b.

Figure 5B:
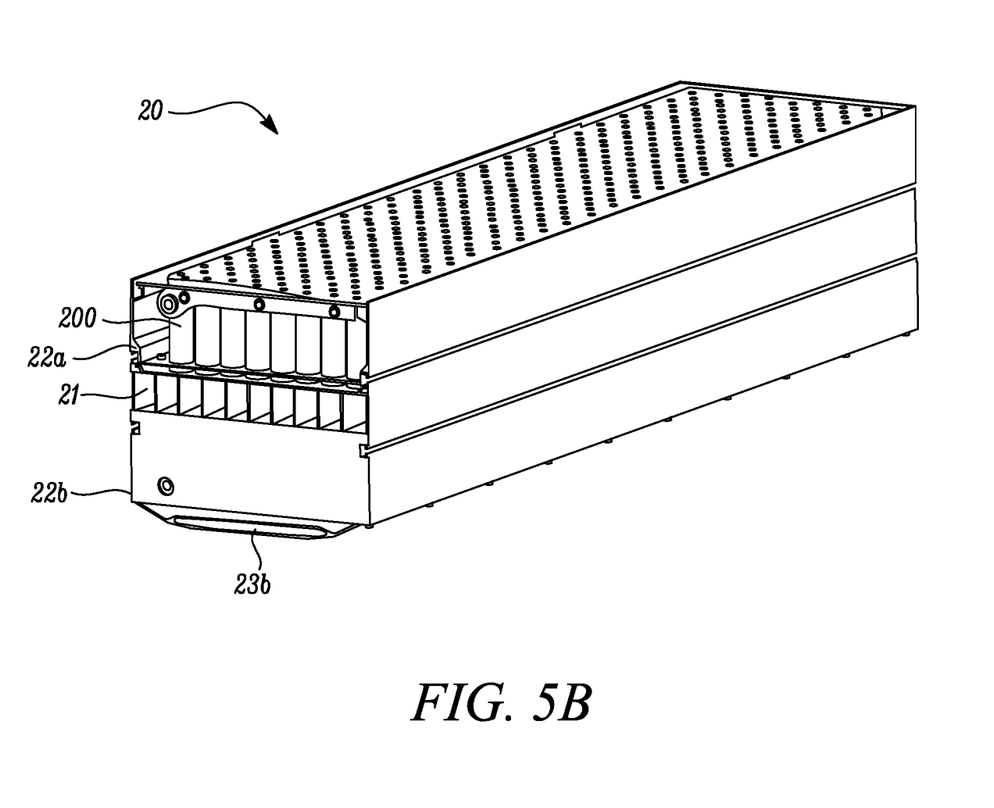
FIG. 5B is a perspective view of the battery pack of FIG. 5A with one of the caps removed.

FIG. 5B

FIG. 5B shows the battery pack 20 with one of the module caps 23a removed. A portion of one of the housing portions 22a is also omitted to show some of the battery cells 200 of the pack 20.

The cells of the battery pack 20 may be of any suitable type, for example cylindrical cells, prismatic cells, pouch cells or cells of another type. In one embodiment the cells are cylindrical cells, for example 18650 cylindrical cells, which extend between opposed first and second ends.

Figure 6A:
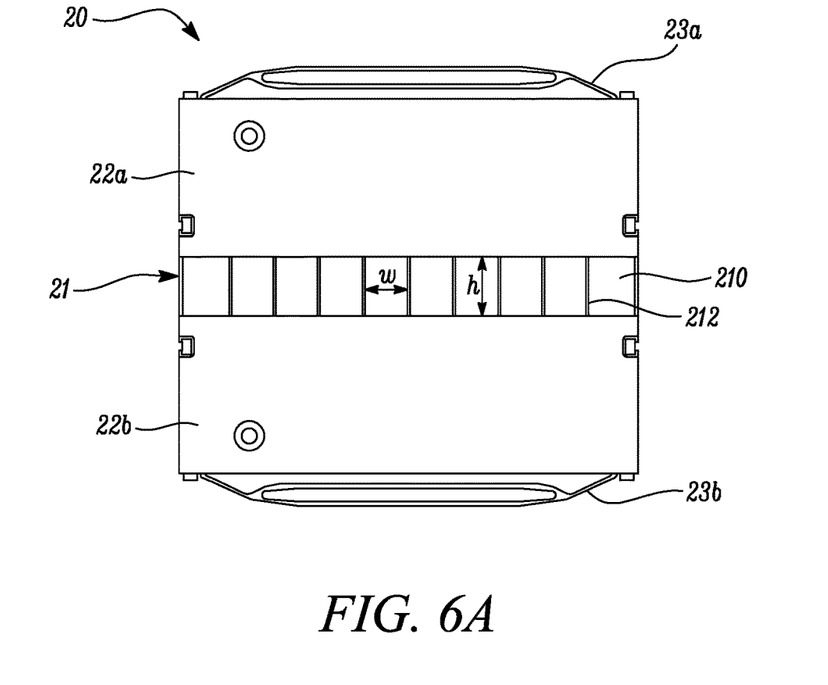
FIG. 6A is a front view of the battery pack.

FIG. 6A

FIG. 6A is a front-on view of the battery pack 20 of FIGS. 5A-B.

From FIG. 6A it can be more clearly seen that the air channel 21 includes multiple (in this case ten) parallel air channels 210 separated by vertical dividing walls 212. In preferred embodiments the entire air channel 21, including the dividing walls, is integrally formed as this improves the mechanical stiffness of the channel 21, which forms the structural backbone of the battery pack 20. In this embodiment the air channel 21, and the multiple parallel channels 210 that form the air channel 21, are of rectangular cross-section but it will be appreciated that other shapes may be used.

The aspect ratios of the parallel channels 210—defined as their height (h) divided by their widths (w)—is preferably greater than 1 as this provides greater vertical stiffness and reduces deflection of the structure under load. This can decrease the fatigue stress to which the wire bonds and other electrical connections in the pack 20 may be subject. An aspect ratio h/w of between 1.1 and 1.6, between 1.2 and 1.5, or between 1.25 and 1.45 may provide particularly good properties. In the illustrated embodiment the two outer-most channels have an aspect ratio of about 1.32, and the remaining eight channels have an aspect ratio of about 1.43.

Whilst not shown in the embodiment of FIG. 6A, in some embodiments the aircraft 10 and/or battery pack 20 may include a secondary thermal regulation system to provide supplemental or replacement thermal regulation during flight and/or during ground-based operations such as charging and pre-heat/pre-cool. For example, a closed loop liquid carrying system may flow a supply of liquid in thermal contact with the cells 200 through one or more additional channels in the battery pack 20.

The one or more additional channels, which may be of smaller cross-section than the air channels 210, may be nestled between adjacent parallel air channels 210 so as to cool (or heat) the cells through the surfaces 211a, 211b. The portion of the flow path of the additional channels that is in thermal contact with the cells may also follow a tortuous, serpentine path to maximize the heat transfer.

Figure 6B:
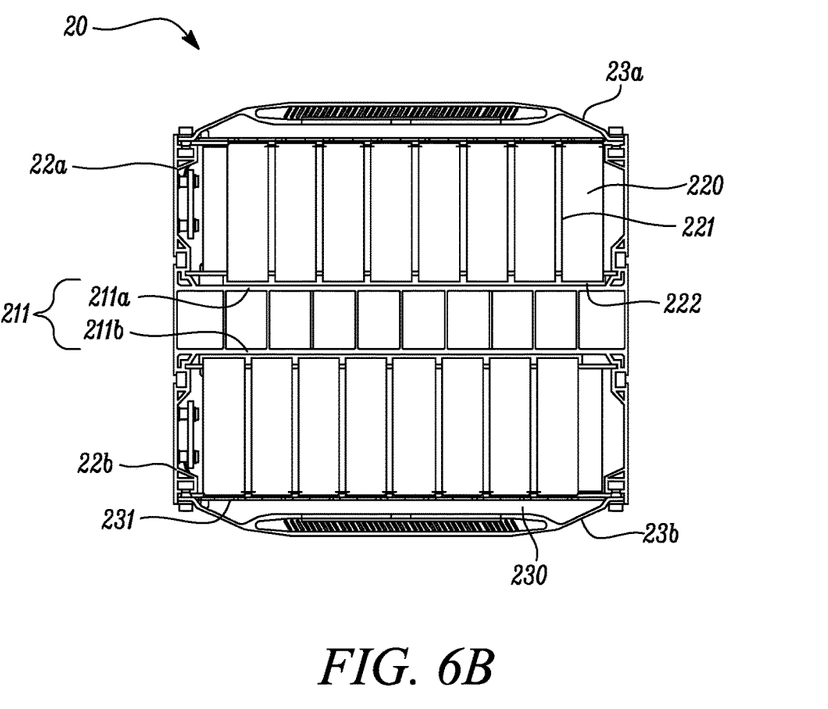
FIG. 6B is a cross-sectional front view of the battery pack, showing further detail including the locations of the battery cells.

FIG. 6B

FIG. 6B shows the battery pack 20 in cross-section so that internal detail is visible. The battery cells are omitted from FIG. 6B for clarity.

The battery pack 20 may be considered to include two sub-modules: one sub-module located on a first side of the air channel 21 and the second sub-module located on the other, opposite, side of the air channel 21. Each of the two sub-modules houses an array of battery cells within the internal volume of a housing portion 22a, 22b.

The cells of each sub-module are electrically connected together in series and parallel (by connecting the cells to bus bars by wire bonds, for example) to increase the sub-module terminal voltage and the maximum rated discharge rate of the sub-module. The two sub-modules may then be connected together in series or parallel to double the pack terminal voltage or maximum discharge rate, or alternatively may not be connected and may instead provide two independent power channels if this is desired.

The internal volume of each housing portion 22a, 22b (hereafter referred to as the housing portion 22) is divided into chambers 220 by dividing walls 221, with each chamber 220 housing one or more cells. The use of chambers 220 and dividing walls 221 improves the mechanical stiffness of the battery pack 20 and promotes thermal isolation between cells, which limits the spread of thermal events.

The cells of each sub-module are cooled from one end (the end closest to the air channel 21) by the air passing through the air channel 21. Specifically, one end of the cells of the first sub-module are in thermal contact with a surface 211a of the wall 211 of the air channel 21, and exchange heat with the air through the surface 211a of the wall. Similarly, one end of the cells of the second sub-module are in thermal contact with an opposite surface 211b of the wall 211 of the air channel 21, and exchange heat with the air through the surface 211b of the wall 211. The use of opposite sides 211a, 211b of the wall 211 to cool separate sub-modules improves the overall energy density of the battery pack 20.

In the illustrated embodiment the cells are retained within silicone rubber bushings 222 which are attached to, or are in close thermal contact with, an external surface of the wall 211 of the air channel. Thus, heat is exchanged between the cells and the air passing through the air channels 21 via the silicone rubber bushings 222 and the wall 211 of the air channel. In other embodiments, the silicone rubber bushings 222 are attached to a base plate, and the base plate is attached to or at least in close thermal contact with the external surface of the wall 211 of the air channel 21. As well as providing thermal bridging, the bushings 222 hold the cells under compression to provide mechanical support and provide electrical insulation between the cells and the heat sink. Thermal grease may be used to aid the insertion of the cells into the bushings 222, which allows for a tighter fit and thus greater compression and cell retention.

In preferred embodiments the housing portions 22a, 22b (including the dividing walls 221 if present) and the air channel 21 (including the dividing walls 212 if present) are integrally formed. In this way, the combination of the air channel 21 and the housing portions 22a, 22b form the main structural component of the battery pack and provide good mechanical stiffness. The air channel 21 and/or the housing may be formed from aluminium, magnesium, a magnesium alloy or another material with a low thermal mass.

The integrally formed air channel 21 and/or housing portions 22 are preferably formed by extrusion. The use of extrusion not only improves the mechanical strength of the pack 20 by eliminating the need for internal joining, but also provides good dimensional tolerances and allows for the addition of complex design features. For instance, the internal surface of the wall 211 of the air channel 21 may include fillets, or complex fin designs (e.g., tapering from the wall 211 to a tip), and extrusion may allow for the inclusion of such design features with minimal additional cost. It will however be understood that the pack 20 may be fabricated in other ways, for example by machining or additive layer manufacturing (ALM).

Each of the sub-modules of the battery pack further includes a cap 23a, 23b (hereafter cap 23) which closes the internal volumes of the housing portions 22a, 22b. As well as generally sealing the battery pack 20 to protect the cells from the external environment, each cap 23 defines an internal volume which provides the respective sub-module with a cell venting region 230. During use, cells may overheat or otherwise experience faults which cause them to vent gas, flames, smoke and other particulates. The cell venting region 230 within the cap 23 provides a space into which the cells can vent these thermal products in a controlled manner, away from the core of the battery pack 20 so as to avoid damage to cells and propagation of thermal events between cells.

Generally, cells have a pre-defined venting direction, which in the case of cylindrical cells is from one of the two ends. The cells are preferably oriented within the housing so that their venting ends point into the venting region 230. In the illustrated embodiment, an internal surface 231 of the module cap 23 is provided with holes or apertures so that the cells can vent directly into the venting region 230.

Figure 7:
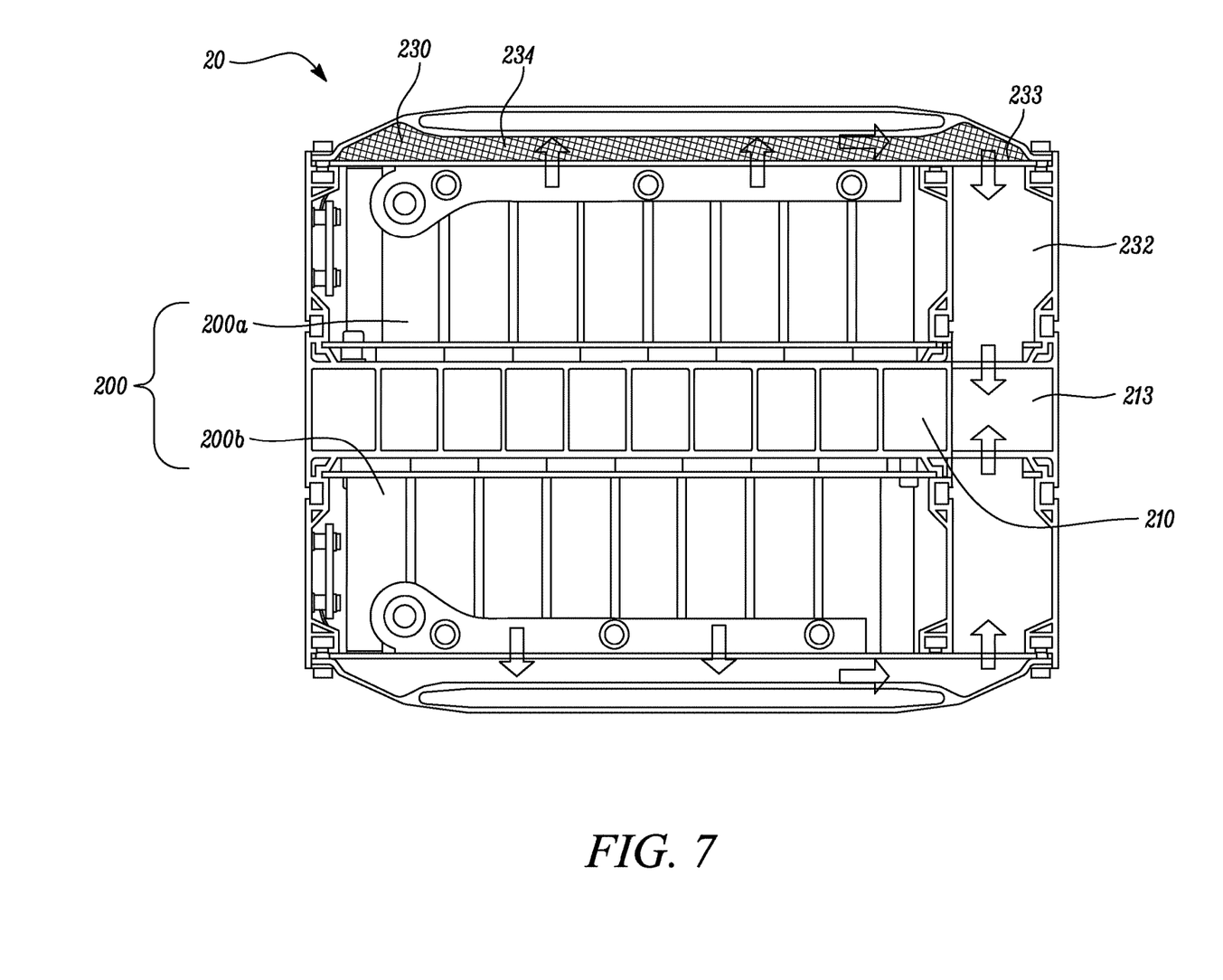
FIG. 7 is a cross-sectional front view of the battery pack, illustrating how thermal products vented by the cells may be removed from the aircraft.

FIG. 7

FIG. 7 illustrates a first embodiment of a battery pack 20 in which a path is provided between the venting region 230 and the exterior of the aircraft 10. Providing such a path helps prevent vented products, particularly gas and smoke, from accumulating within the battery pack 20 and the aircraft 10.

In this embodiment, each of the sub-modules includes a cap 23 in which there is a venting region 230. The cells 200a, 200b of the sub-modules (hereafter the cells 200) are oriented within the housings 22 so that their venting directions are directed towards a venting region 230. An internal surface 231 of the cap 23 has apertures through which the venting ends of the cells can vent into the venting region 230.

So that vented thermal products can escape the battery pack 20 and ultimately the aircraft 10, the battery pack 20 further includes an internal volume or channel 232 which provides a path (indicated by the arrows) between the venting region 231 and an air channel 213. The air channel 213 is, like the air channels 210 described above, in fluid communication with the air inlet 16 and the air outlet 17. Thus, thermal products entering the air channel 213 from the venting region 231 via the path 232 are swept away by the flow of air that results from the movement of the aircraft 10.

In the illustrated embodiment the air channel 213 is dedicated to the removal of vented products from the battery pack 20. In other words, the channel 213 is not one of the cooling air channels 210 described previously, but an additional channel that does not serve a cooling function. Whilst alternative embodiments may utilize one or more of the cooling air channels 210 to vent thermal products, providing one or more separate, dedicated channels 213 for this purpose may be preferable. In some embodiments described herein the cooling air channels 210 may be blocked or reconfigured into a closed loop in some modes of operation, particularly ground-based operations such as recharging. In these instances, the provision of a separate channel 213 prevents vented products from being trapped in the air channels 210 and possibly being recirculated in a closed loop. Further, the vented products will generally be hot, so venting into the cooling channels 210 could reduce the cooling efficiency.

The channel 232 between the venting region and the air channel 213 is preferably located towards an exterior region of the battery pack. This helps limit the transfer of heat from the vented products to the cells 200.

The battery pack 20 may further include a pressure-sensitive element 233 which is configured to seal the venting region 230 until the pressure in the venting region exceeds a threshold pressure. Specifically, the venting region 230 is ordinarily sealed, but if vented products accumulate in the venting region 230 to the point that the internal pressure reaches a threshold level, the pressure-sensitive element 233 allows the passage of the vented products through the path 232 to the air channel 213. The pressure-sensitive element can take any suitable form, but examples include a sacrificial burst disk made from an aluminium sheet or other suitable material; and a one way valve, for example a sprung metal valve.

Some or all of the path between the venting region 230 and the exterior of the aircraft 10 may be filled with a flame arrestor 234 to reduce the risk of the vented products igniting a fire or explosion. The flame arrestor 234 can be included in any portion of the path, including one or more of the venting region 230, the air channel 213 and the channel 232 between the venting region and the air channel 213. Examples of suitable flame arrestors include metal foams, metal mesh and ceramic mesh.

Figure 8:
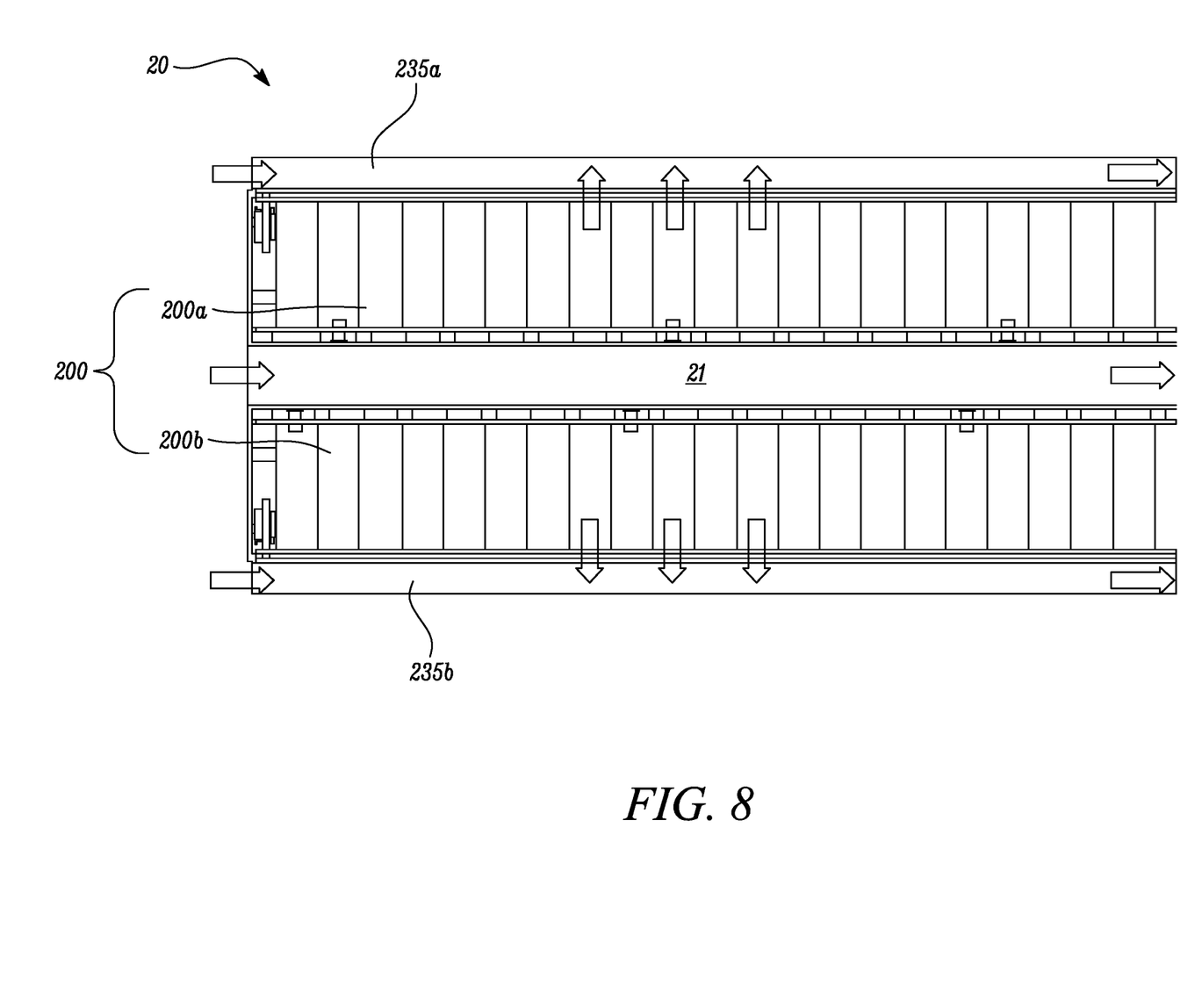
FIG. 8 is a cross-sectional side view of another embodiment of the battery pack, illustrating how thermal products vented by the cells may be removed from the aircraft.

FIG. 8

FIG. 8 illustrates a second embodiment of a battery pack 20 in which a path is provided so that vented products can escape to the exterior of the aircraft 10. The battery pack 20 is shown in a side-on view in which air passes through the central air channel 21 from left to right.

In this embodiment, in addition to the central cooling air channel 21, the battery pack includes further air channels 235a, 235b into which the cells 200 vent directly. Like the central air channel 21, the air channels 235a, 235b are in fluid communication with an air inlet and the air outlet so that the movement of the aircraft creates a flow of air through the channels 235a, 235b. This flow of air sweeps the vented products away out of the battery pack 20 and out of the aircraft 10. In some embodiments the further air channels 235a, 235b supplement the cooling provided by the main, central cooling channel 21.

Thus, unlike the embodiment of FIG. 7 in which there is path 232 between a venting region 230 and air channel 233, in the embodiment of FIG. 8 the venting region is an air channel 235 and the cells vent directly into the air channel 235. This reduces the amount of time the vented products spend within the battery pack 20, which reduces the risk of fire and explosion and the propagation of thermal events.

The air inlet(s) and air outlet(s) to which the further air channel(s) 235a, 235b are coupled may be the same air inlet(s) 16 and air outlet(s) 17 that serve the main air channel 21. However, in some embodiments one or more additional air inlets or outlets may be provided to serve the further air channels 235a, 235b. This may be preferable, for example to ensure thermal products can escape the battery pack 20 and aircraft 10 during recharging where the main air inlet 16 and outlet 17 may be blocked or otherwise unavailable. Furthermore, while in the illustrated embodiment the air channels 235a, 235b are a part of the battery pack 20, in other embodiments the air channels 235a, 235b may be located within the aircraft 10 outside of the battery pack 20.

Whilst the embodiments of both FIG. 7 and FIG. 8 utilize air channels 213, 235 to leverage an airflow to remove vented products from the aircraft 10, other embodiments may take different approaches. For example, in another group of embodiments, a path (e.g., a tube, channel or other form of conduit) is provided between a venting region and an opening or aperture in the external surface of the aircraft 10. In such embodiments it would be preferable to select the locations of the battery pack 20 and the opening in the aircraft 10 so as to keep the length of the path to a short distance. For example, it would be preferable to keep the length of the path below 1 metre, perhaps even less than 50 cm or 30 cm. This may reduce the likelihood and possible impact of ignition of the vented products as they move from the venting region to the exterior of the aircraft.

Figure 9A:
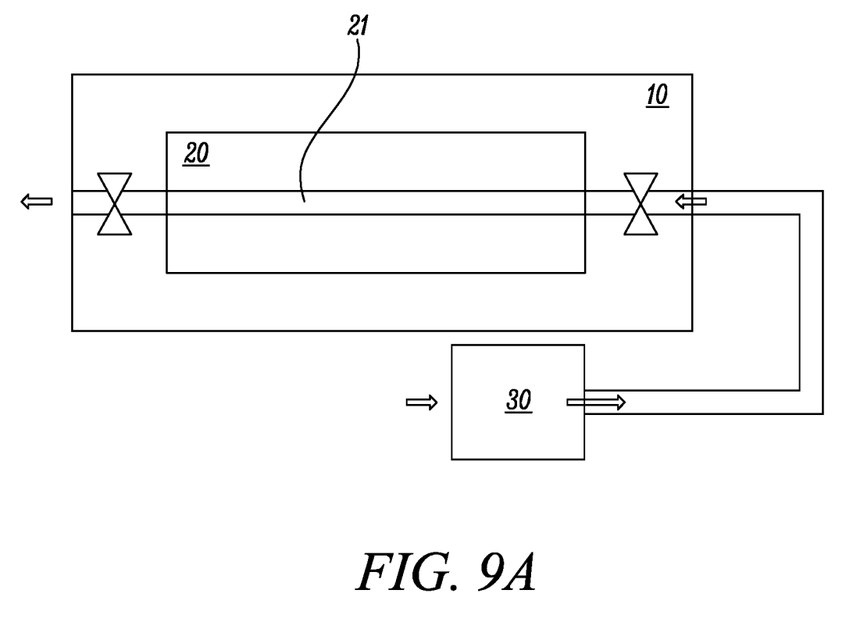
FIG. 9A is a schematic illustration of an electric aircraft with a battery pack cooled by indirect air cooling, connected to an external air supply.

FIG. 9A

As explained previously, one of the potential advantages associated with using the ambient airflow to thermally regulate the cells 200 is weight reduction. This is because some of the equipment typically associated with on-board cooling systems, for example pumps, may be omitted, or may be of reduced size. However, this may leave the aircraft 10 with reduced ability to thermally regulate the cells 200 when there is little or no ambient airflow through the channel 21. This may be a limitation when the aircraft 10 is stationary on the ground and the battery pack 20 is being charged, as the temperature of the cells 200 can limit the rate at which they can be safely charged.

Thus, in accordance with some aspects, the air inlet 16 of the aircraft 10 may be connected to an external supply of air 30 so that air can be delivered through the air channel 21 whilst the aircraft 10 is on the ground. This is illustrated in FIG. 9A. The supply of air 30 may, for example, be a ground-based device such as a fan which can be stored at an airport, vertiport or the like and connected to the air inlet 16 as required.

In order to further improve the efficiency with which heat can be removed during charging, the air supply 30 may be a refrigerated air supply. The air supply 30 may, for example, incorporate a cooler (which may take the form of a heat exchanger) so that the air forced through the air channel 21 is cooler than the ambient air temperature.

In other examples the supply of air 30 may not be cooled (i.e. ambient air may be used), or the air may even be heated by a heater incorporated into the supply 30. This allows the cells 200 to be heated by the airflow. Pre-heating the battery cells 200 to a preferred operating temperature prior to flight or prior to charging reduces the risk of damage to the cells and may improve the efficiency of operation.

In some embodiments, a closed loop may be formed by connecting the air supply 30 to both the inlet 16 and outlet 17 of the aircraft. As well as improving the efficiency of the system, recirculating the same air may reduce the need to filter the air to prevent debris and particles blocking or becoming entrained in the air channel 21. The inlet 16 and/or outlet 17 may be equipped with connectors to facilitate connection to the supply 30.

Utilizing a closed loop also allows the direction of airflow through the air channel 21 to be reversed. In other words, the direction of airflow may be reversed so that, instead of flowing from the inlet 16 to the outlet 17, air flows from the outlet 17 to the inlet 16. Reversing the direction of airflow may reduce the tendency for thermal gradients to develop along the length of the air channel 21. In some embodiments a controller, which may be integrated into the air supply 30 or the aircraft 10, may be provided and configured to control and periodically reverse the direction of air flow.

Whilst not illustrated in FIG. 9A, the aircraft 10 and battery pack 20 may also include a secondary thermal regulation system in the form of one or more additional, liquid carrying, channels, as described above with reference to FIG. 6A.

Figure 9B:
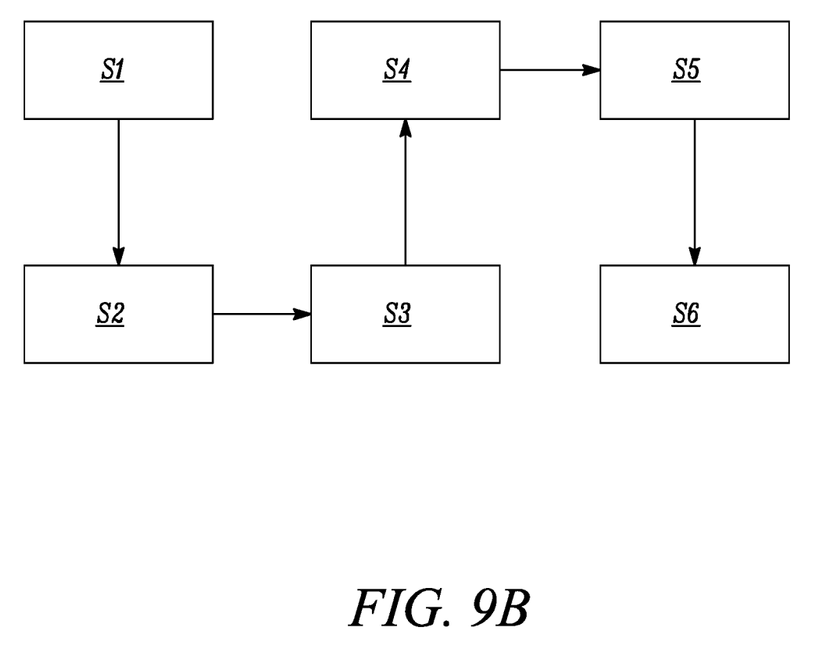
FIG. 9B is a flow diagram illustrating a method for thermally regulating a battery of an aircraft.

FIG. 9B

FIG. 9B is a flow diagram illustrating a method of thermally regulating a battery pack 20 of an electric or hybrid electric aircraft 10. It should be appreciated that, unless the context clearly dictates otherwise, the steps S1-S6 of the method can be performed in a different order.

At step S1, an external, ground-based supply of air 30 is connected to an air inlet 16 of the aircraft. For example, a fan or other source of pressurized air is connected to the inlet using a flexible tube or other conduit so that the air supply 30 can force air through the tube into the air inlet 16. In some embodiments the tube and inlet 16 may be equipped with complimentary connectors (e.g., male and female connectors) to improve the ease with which the air supply 30 can be connected to the inlet 16.

At step S2, the supply of air 30 is further connected to an air outlet 17 of the aircraft 10 so as to form a closed loop. For example, on the side of the fan opposite to the air inlet 16, the air supply may be connected by a tube or other conduit to the air outlet 17 of the aircraft. In this way, air driven through the air inlet 16, through the air channel 21 and out of the air outlet 17 is returned to the air supply 30 for recirculation. It will be appreciated that, in some embodiments, step S2 is not performed and an open loop is instead used for the remaining steps of the method.

At step S3, an external supply of electrical power is connected to the cells 200 of the battery pack 20 in order to charge the cells. Any suitable source of electrical power can be used, for example mains power or a portable source of power such as a battery or generator. It will be appreciated that step S3 may be omitted where the cells 200 do not require charging, for example where the cells are already charged and a pre-heat operation is to be performed.

At step S4, the external air supply 30 delivers a flow of air through the air inlet 16, through the air channel 21 and out of the air outlet 17. Where step S2 is performed, the air passing out of the air outlet 17 returns to the air supply 30 for re-pressurization and recirculation. Otherwise, the air passing out of the air outlet 17 is discharged to the ambient air.

Where the temperature of the air driven through the air channel 21 by the air supply 30 is cooler than the temperature of the surface 211 of the air channel 21, the flow of air carries heat away and thus cools the cells 200. This is desirable where the cells are being charged (step S3) and may allow for more rapid charging. In order to permit even more rapid charging, the air supplied by the air supply 30 may be refrigerated to enhance the cooling rate.

Where the temperature of the air driven through the air channel 21 by the air supply 30 is hotter than the temperature of the surface 211 of the air channel 21, the flow of air heat the cells 200. This is desirable where the cells are being pre-heated to bring them up to a preferred temperature for operation (e.g., prior to flight or prior to a charging cycle). In order to more rapidly heat the cells 200, the air supplied by the air supply 30 may be heated to enhance the heating rate.

At optional step S5, the direction of airflow through the air channel 21 is reversed so that the air supply 30 forces air through the air outlet 17, through the air channel 21 and out of the air inlet 16. For example, the direction of rotation of a fan of the air supply 30 may be reversed to reverse the direction of airflow. This reversal of the airflow may be performed periodically, either under manual control or by a suitably configured controller of the air supply 30 or aircraft 10, in order to reduce the formation of thermal gradients along the length of the air channel 21.

At optional step S6, a liquid is flowed through one or more additional channels in thermal contact with the cells 200 so that heat is exchanged between the cells 200 and the liquid. In this way, supplemental cooling or heating of the cells 200 can be provided. In some embodiments the liquid is pressurized by an on-board pump and flowed through a closed loop contained within the aircraft 10, a portion of which includes the one or more additional channels that are in thermal contact with the cells 200. In other embodiments, the one or more additional channels are connected to an external supply of liquid which is pumped through the one or more additional channels. The liquid may be cooled or heated by an on-board heater or cooler (e.g., a heat exchanger) or the like in order to maintain efficient supplemental cooling or heating of the cells.

In order to reduce the weight of the aircraft during flight, the additional channels may be selectively filled and drained of the liquid. To facilitate this, the aircraft 10 may include a suitable inlet/outlet for filling and draining the liquid as required.

Figure 10:
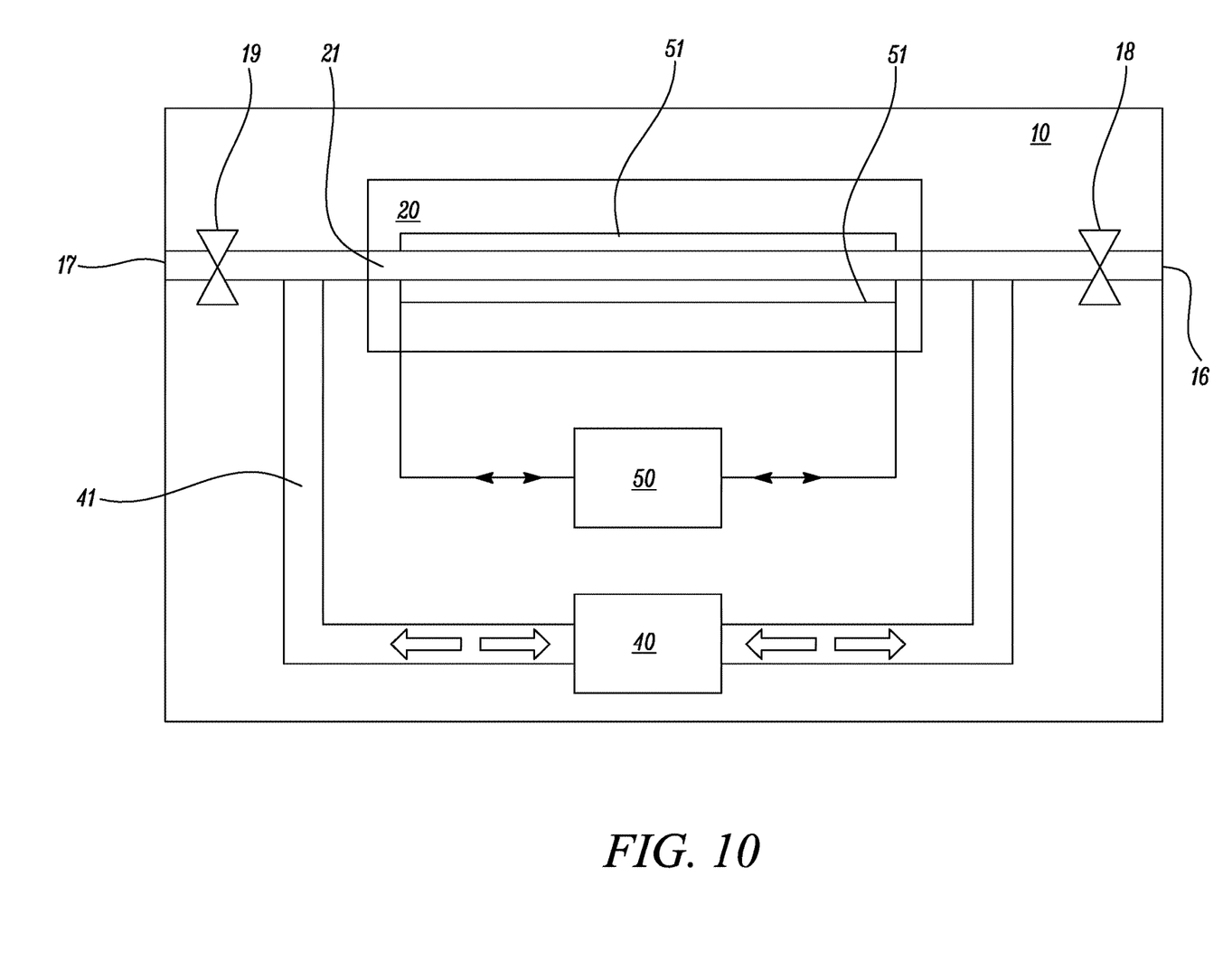
FIG. 10 is schematic illustration of an electric aircraft with a reconfigurable battery thermal regulation system.

FIG. 10

FIG. 10 illustrates another embodiment of an aircraft 10 and battery pack 20 in which the on-board battery thermal regulation system has multiple modes of operation.

As in each of the embodiments described above, the aircraft 10 and battery pack 20 define an air channel 21 which is in fluid communication with one or more aircraft air inlets 16 and air outlets 17. During flight, the flow of air through the air channel 21 that results from the movement of the aircraft through the air is leveraged to provide cooling. This mode of operation is hereafter referred to as the first mode of operation of the battery thermal regulation system of FIG. 10.

Whilst the first mode of operation may provide a high level of cooling during normal flight, it may be unsuitable for thermally regulating the battery when there is no or limited airflow through the air channel 21. This will typically be the case when the aircraft 10 is on the ground, but could also be the case during vertical take-off and landing manoeuvers; where ambient conditions are particularly hot; or where, for example, the air inlet 16 becomes blocked. To this end, the thermal regulation system of FIG. 10 has a second mode of operation in which an on-board airflow device 40, for example fan, compressor of the like, drives a flow of air through the air channel 21 to thermally regulate the cells 200.

In the embodiment illustrated in FIG. 10, the airflow device 40 is arranged within a second air channel 41 separate to the first, main air channel 21. In the first mode of operation the airflow device 40 does not operate and the second air channel 41 may be completely disconnected from the first channel 21. In the second mode of operation, however, the second air channel 41 is connected to the first air channel 21 and the airflow device 40 operates to blow a flow of air through the second air channel 41 and into the first air channel 21.

In some embodiments, the first air channel 21 is completely fluidly disconnected from the inlet 16 and the outlet 17 in the second mode of operation. In this case the first air channel 21 and the second air channel 41 form a closed loop, and the airflow device 40 circulates air around the closed loop. The disconnection of the first air channel 21 from the inlet 16 and outlet 17 may be achieved by closing the airflow regulators 18, 19, or by using suitable actuators to reconfigure a portion of the airflow path so that air can flow from the second air channel 41 to the first air channel 21, but air entering the inlet 16 cannot reach the first channel 21.

In other embodiments, however, the first air channel 21 may remain in fluid communication with the inlet 16 and outlet 17 during the second mode of operation. In this case, the airflow device 40 enhances the ambient airflow through the first channel 21. In some embodiments there may be no second channel at all and the airflow device 40 may instead be arranged within the first air channel 21, or in the path between the inlet 16 and air channel 21. However, this may be less preferred as it may not be operable where the air inlet 16 becomes blocked. It may also constrain the size or power of the airflow device 40 to the extent that the flow rate through the first air channel 21 in the second mode of operation is limited.

In preferred embodiments, the airflow device 40 is reversible such that the direction of airflow driven through the first channel 21 can be reversed. This may be particularly useful during ground-based charging, where periodic reversal of the airflow direction helps prevent the establishment of thermal gradients along the length of the first air channel 21. The direction of airflow can be reversed by, for example, reversing the direction of rotation of a fan or compressor of the airflow device 40 or by reconfiguring the flow path of the second channel 41 so that air enters the first channel 21 at the opposite end. A controller (not shown) located in the aircraft 10 or battery pack 20 may control the airflow device 40 to periodically reverse the direction of the airflow.

In order to enhance the thermal regulation of the cells 200 in the second mode of operation, the airflow driven by the airflow device 40 may be cooled or heated as appropriate. For example, the airflow device 40 may include or be operably coupled to a heater or cooler (e.g., a heat exchanger or the like) to heat or cool the air. Where present, the heat exchanger may be arranged to dump heat, or receive heat from, outside of the aircraft 10. Alternatively, heat may be dumped to or drawn from the cabin of the aircraft to provide environmental control.

Although the provision of the on-board airflow device 40 and its associated second mode of operation may eliminate the need to use an external air supply 30 during ground-based operations, it will be understood that an external air supply 30 may still be used with the embodiment of FIG. 10. Indeed, where an external air supply 30 is available, it may be preferable to use it as it may be capable of providing more rapid cooling or heating and reduces the amount of on-board power consumed by the thermal regulation system. However, where no external supply 30 is available, the second mode of operation provides an alternative and may permit more rapid charging and thus more rapid turnaround than would otherwise be possible.

FIG. 10 also illustrates additional cooling channels 51, which have been described above with reference to FIGS. 6A-B and 9A-B and are arranged to carry a liquid in thermal contact with the battery cells 200. The thermal regulation provided by the additional cooling channels 51 can supplement or replace the thermal regulation provided by the first cooling channel 21 during the first and/or second modes of operation.

In this embodiment, the liquid is carried in a closed loop and pressurized by an on-board pressurization unit 50 (e.g., a suitable pump). Preferably the pump is reversible so that the direction of fluid flow through the portion of the channels 51 in thermal contact with the cells 200 can be reversed to eliminate or reduce the formation of thermal gradients along the length of the pack 20.

If present, the additional channels 51 are preferably arranged so that, during their intended use (e.g., during horizontal flight or on the ground), they form an angle with horizontal to assist with degassing. In some embodiments the aircraft 10 and/or battery pack 20 may be provided with a liquid inlet/outlet so that the channels can be filled with and drained of liquid. In this way, the aircraft 10 need not carry the weight of the liquid during flight, but can benefit from additional ground-based thermal regulation, for example to permit more rapid charging.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An aircraft comprising:
a battery pack having a plurality of battery cells; and
a channel in fluid communication with an aircraft air inlet and an aircraft air outlet whereby, during flight, air enters the aircraft through the inlet, flows through the channel and exits the aircraft through the outlet, wherein:
each of the battery cells is arranged to vent into a venting region of the battery pack;
a path is between the venting region of the battery pack and the channel, whereby thermal products vented by the battery cells can exit the aircraft via the path and the channel; and
a pressure-sensitive element is arranged in the path between the venting region and the channel, the pressure-sensitive element being configured to seal the venting region from the channel until a pressure in the venting region exceeds a threshold level.

2. The aircraft of claim 1, wherein the pressure-sensitive element is an over-pressure activated burst disk or a one-way valve with a cracking pressure.

3. The aircraft of claim 1, wherein
the battery cells of the battery pack are enclosed within a housing, and
air flowing through the channel does not directly contact the battery cells within the housing.

4. The aircraft of claim 1, wherein the channel is an air cooling channel whereby, during flight, air enters the aircraft through the inlet, flows through the air cooling channel and exchanges heat with the battery cells through a surface of the air cooling channel, and exits the aircraft through the outlet.

5. The aircraft of claim 4, wherein air passing through the channel does not directly contact the battery cells and only exchanges heat with the battery cells through the surface of the air cooling channel.

6. The aircraft of claim 1, wherein the channel is an integral part of the battery pack.

7. The aircraft of claim 1, wherein each of the battery cells extends between a first end and an opposed second end, and the cells are arranged to vent from their second ends into the venting region.

8. The aircraft of claim 1, wherein the air inlet and the air outlet are:
located on an exterior surface of a fuselage of the aircraft; or
located on a propulsor of the aircraft.

9. The aircraft of claim 1, wherein the venting region and/or the path contains a flame arrestor.

10. The aircraft of claim 9, wherein the flame arrestor comprises one or more of: metal foam; metal mesh; and ceramic mesh.

11. The aircraft of claim 1, wherein the venting region is located within a cap of the battery pack.

12. The aircraft of claim 1, wherein each battery cell has a pre-determined venting direction, and the cells are oriented with respect to their venting directions such that each cell vents into the venting region.

13. The aircraft of claim 1, wherein the battery pack comprises a plurality of venting regions, each cell is arranged to vent into one of the plurality of venting regions, and there is a respective path between each respective one of the plurality of venting regions and an exterior of the aircraft.

14. The aircraft of claim 1, wherein the channel comprises a plurality of parallel channels separated by dividing walls.

15. The aircraft of claim 1, wherein the channel extends substantially an entire length of the battery pack.

16. The aircraft of claim 1, being of the VTOL type.

17. A battery pack for an aircraft, comprising:
a plurality of battery cells;
a channel for fluid communication with an aircraft air inlet and an aircraft air outlet whereby, during flight, air enters the aircraft through the inlet, flows through the channel and exits the aircraft through the outlet;
a venting region, wherein each of the battery cells is arranged to vent into the venting region;

a path between the venting region and the channel, whereby thermal products vented by the battery cells can exit the aircraft via the path and the channel; and a pressure-sensitive element arranged in the path between the venting region and the channel, the pressure-sensitive element being configured to seal the venting region from the channel until a pressure in the venting region exceeds a threshold level.

18. The aircraft of claim 14, wherein an aspect ratio of each of the plurality of parallel channels, defined as a height of the channel divided by a width of the channel in a plane perpendicular to a direction of airflow, is between 1.1 and 1.6.

19. The aircraft of claim 1, wherein the battery pack comprises a first array of battery cells and a second array of battery cells, the channel being arranged between the first and second arrays of battery cells so that the first and second arrays are on opposite sides of the channel, and portions of a surface of the channel are in thermal contact with both the first and the second arrays of battery cells whereby air flowing through the channel exchanges heat with both the first and second arrays of battery cells through the surface of the channel.

* * * * *